United States Patent
Ohsaka

(10) Patent No.: US 9,055,679 B2
(45) Date of Patent: Jun. 9, 2015

(54) INFORMATION PROCESSING DEVICE

(71) Applicant: Masayuki Ohsaka, Kanagawa (JP)

(72) Inventor: Masayuki Ohsaka, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/362,476

(22) PCT Filed: Nov. 13, 2012

(86) PCT No.: PCT/JP2012/079339
§ 371 (c)(1),
(2) Date: Jun. 3, 2014

(87) PCT Pub. No.: WO2013/088885
PCT Pub. Date: Jun. 20, 2013

(65) Prior Publication Data
US 2014/0337994 A1    Nov. 13, 2014

(30) Foreign Application Priority Data
Dec. 16, 2011 (JP) .................................. 2011-275604

(51) Int. Cl.
| | |
|---|---|
| H05K 1/02 | (2006.01) |
| G06F 21/60 | (2013.01) |
| H05K 5/02 | (2006.01) |
| G06F 21/87 | (2013.01) |

(52) U.S. Cl.
CPC .............. *H05K 1/0275* (2013.01); *G06F 21/60* (2013.01); *H05K 5/02* (2013.01); *G06F 21/87* (2013.01)

(58) Field of Classification Search
None
See application file for complete search history.

(56) References Cited

U.S. PATENT DOCUMENTS

| | | | |
|---|---|---|---|
| 5,185,717 A | 2/1993 | Mori | |
| 6,496,119 B1 | 12/2002 | Otterstedt et al. | |
| 7,638,866 B1 * | 12/2009 | Bean et al. | 257/686 |
| 2002/0125814 A1 * | 9/2002 | Uchida | 313/483 |

FOREIGN PATENT DOCUMENTS

| | | |
|---|---|---|
| JP | 02-044447 A | 2/1990 |
| JP | 2002-529928 A | 5/2000 |
| JP | 2001-244414 A | 9/2001 |
| JP | 2003-196158 A | 7/2003 |
| JP | 2006-140338 A | 6/2006 |
| JP | 2006-228910 A | 8/2006 |

(Continued)

OTHER PUBLICATIONS

International Search Report of PCT/JP2012/079339 dated Jan. 29, 2013.

*Primary Examiner* — David Le
(74) *Attorney, Agent, or Firm* — Sughrue Mion, PLLC

(57) ABSTRACT

An information processing device of the invention has a first board on which a tamper detection pattern is installed, a second board that is arranged to face the first board and on which a tamper detection pattern is installed, and sidewalls that are arranged between the first and second boards and along the outer periphery of the first and second boards and that include a plurality of layers (41 and 43) upon which electrodes (33 and 34) for tamper detection are provided. A circuit that needs to be tamper proof is provided in the space that is enclosed by the first and second boards and the sidewalls. The sidewalls have a structure in which electrodes (34) in one layer (43) of the two layers (41 and 43) that are adjacent with an insulating layer (42) interposed there between are arranged at positions corresponding to the spaces between the electrodes provided in the other layer (41).

6 Claims, 5 Drawing Sheets

(56) References Cited

FOREIGN PATENT DOCUMENTS

| | | |
|---|---|---|
| JP | 2008-033593 A | 2/2008 |
| JP | 2008-130737 A | 6/2008 |
| JP | 2009-140279 A | 6/2009 |
| JP | 2009-181217 A | 8/2009 |
| JP | 2009-193119 A | 8/2009 |
| JP | 2010-287060 A | 12/2010 |
| WO | 2004/066691 A1 | 8/2004 |

* cited by examiner

INFORMATION PROCESSING DEVICE

CROSS REFERENCE TO RELATED APPLICATIONS

This is a National Stage of International Application No. PCT/JP2012/079339 filed Nov. 13, 2012, claiming priority based on Japanese Patent Application No. 2011-275604 filed Dec. 16, 2011, the contents of all of which are incorporated herein by reference in their entirety.

TECHNICAL FIELD

The present invention relates to an information processing device having a circuit that needs to be tamper proof.

BACKGROUND ART

The act of tampering refers to reading secret information from a memory device or altering secret information by unauthorized means, and in a broader sense, also includes the act of breaking into the case that houses a memory device. One such act of breaking into a case is, for example, the act of penetrating the board within a case with a thin needle-shaped tool. One known method of protecting a memory device, that is an object that is to be protected from tampering, employs a substrate surrounded by a conducting part for detection of tampering.

Compared to the boards that enclose the top and bottom of a memory device, the protective countermeasures applied in the sidewalls provided between these boards have been found, some cases, to be inadequate. As a strengthened protective measure for sidewalls, a method is disclosed in Patent Document 1 that consists of using protective boards, to which wires have been provided to detect tampering, to protect all surfaces.

In the device disclosed in Patent Document 1, wires are provided not only on the overlying and underlying protective boards but also on the protective boards of the side surfaces. In the device disclosed in this document, a single wire is arranged at a fixed spacing in a predetermined direction on the surface of each protective board, and this wire is connected to a tamper-monitoring circuit by way of a connector. By means of this configuration, when a person attempting to tamper pierces the protective board of a sidewall with a sharp tool, the wire is broken by the sharp tool, whereupon the tamper-monitoring circuit detects the act of tampering.

LITERATURE OF THE PRIOR ART

Patent Document

Patent Document 1: Japanese Unexamined Patent Application Publication No. 2008-033593

SUMMARY OF THE INVENTION

When a person attempting to tamper the memory device penetrates between wires with a thin needle-like tool that is narrower than the distance between the wires on a side-surface protective board of the device disclosed in Patent Document 1, the tool does not come into contact with the wires. In this case, the concern arises that the tampering will not be detected.

An exemplary object of the invention is to provide an information processing device in which tamper proof can be augmented in sidewalls of the device.

An information processing device according to an exemplary aspect of the invention includes a first board on which a tamper detection pattern is installed, a second board on which a tamper detection pattern is installed and that is arranged to face the first board, and sidewalls that are arranged between the first and second boards along the outer peripheries of the first and second boards and that include a plurality of layers in which electrodes for tamper detection are provided, and wherein a circuit that needs to be tamper proof is provided in a space enclosed by the first and second boards and the sidewalls, and the sidewalls are of a construction in which electrodes in one layer of two layers that are adjacent to each other, with an insulating layer interposed there between, are arranged at positions corresponding to spaces between the electrodes that are provided on the other layer.

MODE FOR CARRYING OUT THE INVENTION

First Exemplary Embodiment

Figure 1:
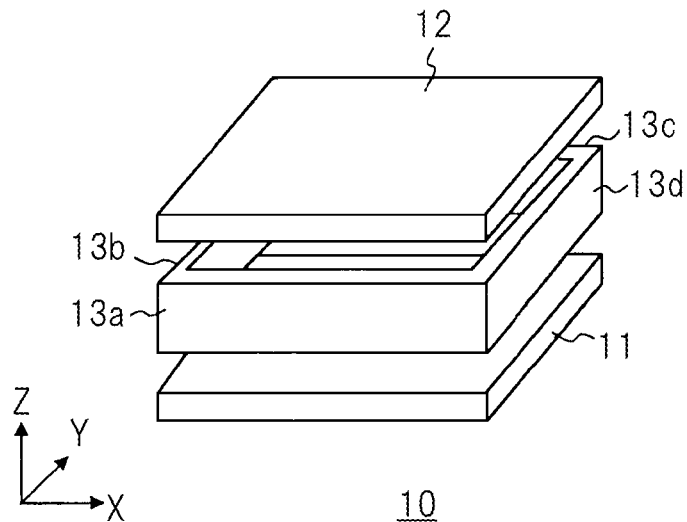
FIG. 1 is an exploded perspective view showing an example of the configuration of a module that is provided in the information processing device of the first exemplary embodiment.

The configuration of the module that is provided in the information processing device of the present exemplary embodiment is next described. FIG. 1 is an exploded perspective view showing an example of the configuration of a module that is provided in the information processing device of the present exemplary embodiment.

Module 10 shown in FIG. 1 is a component for protecting a circuit that needs to be tamper proof. As shown in FIG. 1, module 10 is made up of: board 11 in which the circuit that needs to be tamper proof is provided on the upper surface; board 12 that is arranged to face board 11; and sidewalls 13a-13d arranged between boards 11 and 12 and along the outer periphery of these boards. For the purpose of explanation, the x-axis, y-axis, and z-axis are defined as shown in FIG. 1. FIG. 1 shows a state in which, when module 10 is placed on the XY plane, sidewalls 13a-13d and board 12 are separated from board 11 in the z-axis direction.

A tamper detection pattern that is an electrode pattern for detecting tampering is installed on boards 11 and 12. No particular limitations apply to the configuration of the tamper detection pattern that stretches over boards 11 and 12, and a detailed description of this configuration is omitted in the present exemplary embodiment.

In the present exemplary embodiment, each of sidewalls 13a-13d is of a configuration that includes an anisotropic conductive rubber connector. Sidewalls 13a-13d not only serve the role of protecting the circuit that needs to be tamper proof from break-in from the side surface of the case but also serve the role of electrically connecting the tamper detection pattern installed on board 12 to board 11.

In the present exemplary embodiment, tamper detection patterns are also applied to the anisotropic conductive rubber connectors of sidewalls 13a-13d, whereby sidewalls 13a-13d also serve the role of detecting tampering from the side surfaces of the case. Accordingly, the circuit that needs to be tamper proof is present in a space that is surrounded by sidewalls 13a-13d and boards 11 and 12 on which tamper detection patterns have been installed. The circuit that needs to be tamper proof may also be provided on a different board that is arranged in the space that is surrounded by boards 11 and 12 and sidewalls 13a-13d. The details of the tamper detection patterns that are provided on the anisotropic conductive rubber connectors will be described hereinbelow.

Figure 2:
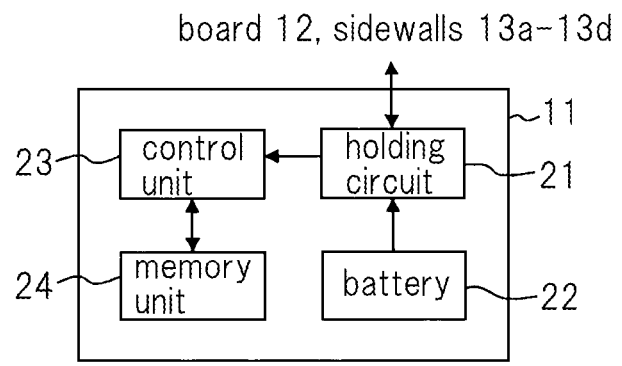
FIG. 2 is a block diagram showing an example of the configuration of the module shown in FIG. 1.

FIG. 2 is a block diagram showing an example of the configuration of the module shown in FIG. 1.

Board 11 of module 10 shown in FIG. 1 is provided with holding circuit 21 that detects tampering based on change in the potential of the tamper detection pattern, battery 22 for supplying electric power to holding circuit 21 when the power supply of the information processing device (not shown) is OFF, memory unit 24 that stores highly confidential information, and control unit 23 that controls each component. Memory unit 24 is, for example, nonvolatile memory, and corresponds to the circuit that needs to be tamper proof.

Control unit 23 includes memory (not shown) that stores programs and a CPU (Central Processing Unit) (not shown) that executes processing in accordance with programs. Programs may be stored in memory unit 24, and in this case, the CPU (not shown) in control unit 23 reads programs from memory unit 24 to execute predetermined processing. When the power supply of information processing device (not shown) is ON, holding circuit 21, memory unit 24, and control unit 23 are each powered by electric power that is supplied from the main body of the information processing device.

The configuration of sidewalls 13a-13d that include the tamper detection pattern is next described. The tamper detection patterns that are installed on sidewalls 13a-13d are all equivalent, and the following explanation therefore relates only to sidewall 13a.

Figure 3A:
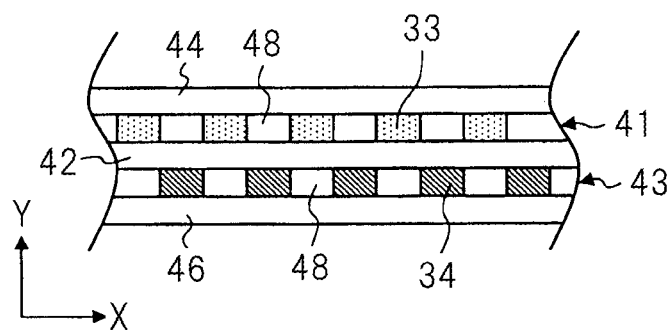
FIG. 3A is a top view showing an example of the configuration of a sidewall of module shown in FIG. 1.
Figure 3B:
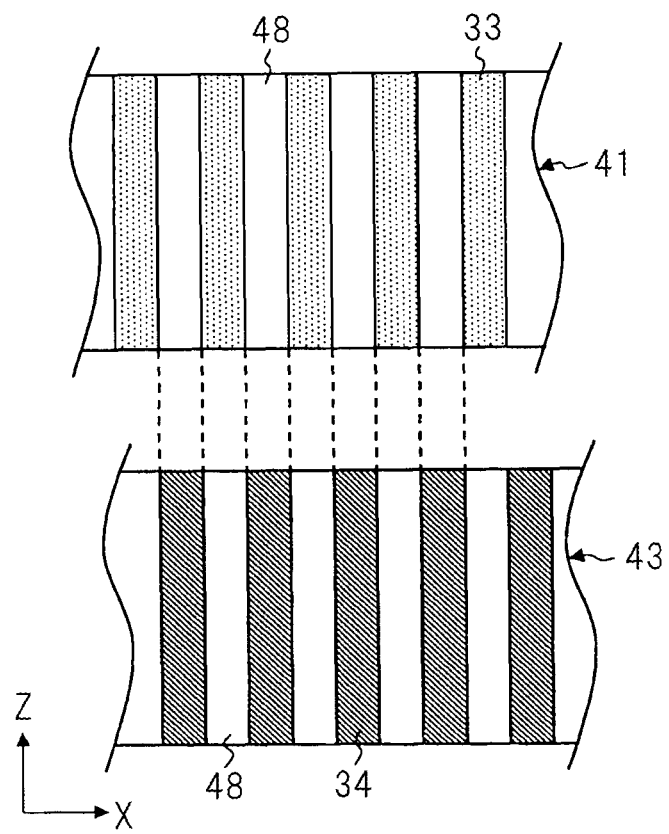
FIG. 3B is a cutaway side view showing an example of the configuration of a sidewall of the module shown in FIG. 1.

FIG. 3A is a top view showing an example of the configuration of the sidewall in the present exemplary embodiment, and FIG. 3B shows cutaway side views of this configuration. FIG. 3A shows the surface of sidewall 13a that connects with board 12, and FIG. 3B shows planar cutaway views of sidewall 13a when viewing the case from the side. FIGS. 3A and 3B show portions of sidewall 13a.

As shown in FIG. 3A, an anisotropic conductive rubber connector includes electrode layer 41 in which electrodes 33 are arranged at an equal spacing with insulation units 48 interposed, and electrode layer 43 that is arranged to face electrode layer 41 with insulating layer 42 interposed. Electrode layer 43 is positioned closer to the outside of the case than electrode layer 41. The y-axis plus-direction surface of electrode layer 41 is covered by insulating layer 44, and the y-axis minus-direction surface of electrode layer 43 is covered by insulating layer 46.

The material of electrodes 33 and 34 is conductive rubber, and the material of insulating layers 42, 44, and 46 and insulation units 48 is insulating rubber. At least insulating layer 46 is preferably a material that does not transmit light such that the patterns of each of electrodes 33 of electrode layer 41 and electrodes 34 of electrode layer 43 cannot be seen when viewed from the side surface of the case.

Referring to FIG. 3A, electrodes 34 provided in electrode layer 43 are arranged at positions that correspond to the spaces between electrodes 33 provided in electrode layer 41. To explain in more detail, if "width" is the length in the x-axis direction of the configuration of electrodes 33 and 34, each of electrodes 33 and 34 in the construction shown in FIG. 3A have the same width with respect to the x-axis direction. Further, each of electrodes 33 and 34 are arranged at the same pitch with respect to the x-axis direction, but the positions in the x-axis direction of electrodes 34 are shifted with respect to the positions of electrodes 33 in the plus direction or the minus direction of the x-axis by exactly the width of electrodes 33. As a result, the positions of electrodes 34 coincide with the positions of insulation units 48 that are arranged between adjacent electrodes 33.

The planar patterns of the electrodes of electrode layers 41 and 43 are next described with reference to FIG. 3B.

The upper portion of FIG. 3B shows the pattern layout of electrodes 33 that are arranged in one electrode layer 41 of the two electrode layers 41 and 43, and the lower portion of FIG. 3B shows the pattern layout of electrodes 34 that are arranged in the other electrode layer 43.

As shown in the upper portion of FIG. 3B, the pattern of each of electrodes 33 provided in electrode layer 41 is rectangular, the longitudinal direction coinciding with the z-axis direction. Each of electrodes 33 is connected to board 12 at one of the short sides of the two short sides of the rectangular pattern and is further connected to board 11 at the other short side.

As shown in the lower portion of FIG. 3B, each of electrodes 34 provided in electrode layer 43 has a rectangular pattern with the longitudinal direction of these electrodes coinciding with the z-axis direction, as with electrodes 33, but electrodes 34 are arranged shifted in the x-axis direction so as not to overlap with electrodes 33. Each of electrodes 34 connects with board 12 at one of the two short sides of the rectangular pattern and connects with board 11 at the other short side. The broken lines in FIG. 3B indicate the positions of insulation units 48 between electrodes 33 of electrode layer 41 that correspond to the positions of electrodes 34 of electrode layer 43.

The tamper detection pattern of the present exemplary embodiment is made up of a combination of the pattern of electrodes 33 provided on electrode layer 41 and the pattern of electrodes 34 provided on electrode layer 43. Electrodes 33 are connected to holding circuit 21 shown in FIG. 2. A predetermined potential is applied from holding circuit 21 to each of electrodes 33, and a potential that differs from electrodes 33 is applied to each of electrodes 34. In the present exemplary embodiment, the ground potential (GND) is applied to each of electrodes 34. GND that is applied to electrodes 34 may be supplied from holding circuit 21 or may be supplied from the main body of the information processing device (not shown in the figure). The signal that is represented by the predetermined potential that is applied to electrodes 33 is referred to as the "signal for tamper detection."

Figure 4:
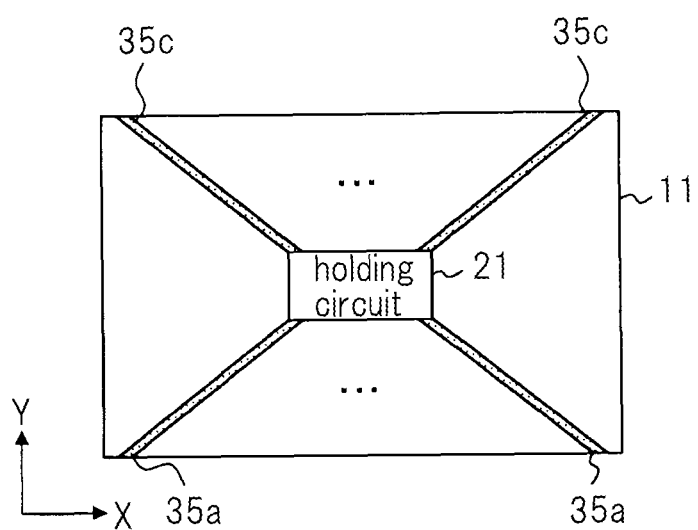
FIG. 4 is a cutaway plan view showing an example of the connection configuration between the anisotropic conductive rubber connector and holding circuit that are provided in the module shown in FIG. 1.

FIG. 4 is a cutaway plan view showing an example of the connection configuration of the holding circuit and the anisotropic conductive rubber connector, and is the view seen when looking at board 11 shown in FIG. 1 from board 12 in the minus direction of the z-axis. FIG. 4 shows one example of the method of connecting holding circuit 21 and sidewalls 13a and 13c. In FIG. 4, the connection configuration of holding circuit 21 and sidewalls 13b and 13d as well as the configuration of battery 22, control unit 23, and memory unit 24 are omitted.

A plurality of wires 35a connected to holding circuit 21 are arranged along the x-axis direction. Each wire 35a is connected to each electrode 33 of sidewall 13a. In addition, a plurality of wires 35c that are connected to holding circuit 21 are arranged along the x-axis direction. Each wire 35c is connected to each electrode 33 of sidewall 13c. Although FIG. 4 shows wires 35a and 35c for the sake of explanation, wires 35a and 35c are preferably embedded within board 11.

Although not shown in the figure, electrodes 34 of sidewalls 13a and 13c are connected to GND of board 11. In addition, on board 11, the reference number of the wires that are connected to electrodes 33 of sidewall 13b is "35b," and the reference number of the wires that are connected to electrodes 33 of sidewall 13d is "35d."

Wires 35a and 35c shown in FIG. 4 are only one example of the configuration for connecting holding circuit 21 with the anisotropic conductive rubber connectors, and the wiring pattern provided on board 11 is not limited to the configuration shown in FIG. 4. For example, a configuration in which one wire 35a is connected to a plurality of electrodes 33 is also possible. Wires 35a-35d described with reference to FIG. 4 may also be a portion of a tamper detection pattern provided on board 11.

As described with reference to FIG. 4, holding circuit 21 is connected with a tamper detection pattern (not shown) that is provided on board 12 by way of wires 35a-35d of board 11 and the anisotropic conductive rubber connectors of sidewalls 13a-13d.

Even when the power supply of the information processing device is in the OFF state, holding circuit 21 is powered by electric power supplied from battery 22, and a fixed voltage is supplied to electrodes 33 of sidewalls 13a-13d by way of wires 35a-35d, whereby a signal for tamper detection in the tamper detection pattern is always maintained at a fixed potential level even when the power supply of the information processing device is in the OFF state.

Holding circuit 21 monitors the potential level of the signal for tamper detection of the tamper detection patterns of boards 11 and 12 and sidewalls 13a-13d and judges that an act of tampering has occurred when the potential level of the signal for tamper detection changes. For example, upon detecting that the potential level of the signal for tamper detection of electrodes 33 has changed from a predetermined potential to GND, holding circuit 21 judges that a short-circuit has occurred in a tamper detection pattern, and upon detecting that electrodes 33 have switched from a conductive state to a non-conductive state, judges that a tamper detection pattern has been cut.

In addition, upon judging that tampering has occurred based on the change of the potential of the signal for tamper detection, holding circuit 21 transmits a tampering detected signal that is a signal indicating that tampering has been detected to control unit 23 if the power supply of information processing device is in the ON state, and saves the tampering detected signal if the power supply of the information processing device is in the OFF state. When the power supply of the information processing device is subsequently turned ON, holding circuit 21 transmits the saved tampering detected signal to control unit 23.

Upon receiving the tampering detected signal from holding circuit 21, control unit 23 deletes the highly confidential information that is saved in memory unit 24.

In addition, a configuration similar to the tamper detection pattern that was described with reference to FIGS. 3A and 3B may also be provided as a tamper detection pattern on boards 11 and 12.

Figure 5:
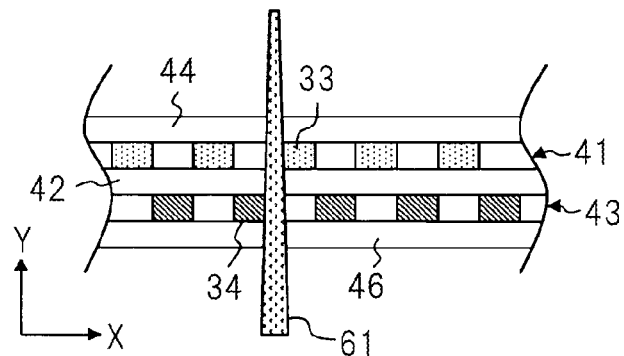
FIG. 5 is a schematic view showing an example when a needle-like tool penetrates the sidewall shown in FIG. 1.
Figure 6:
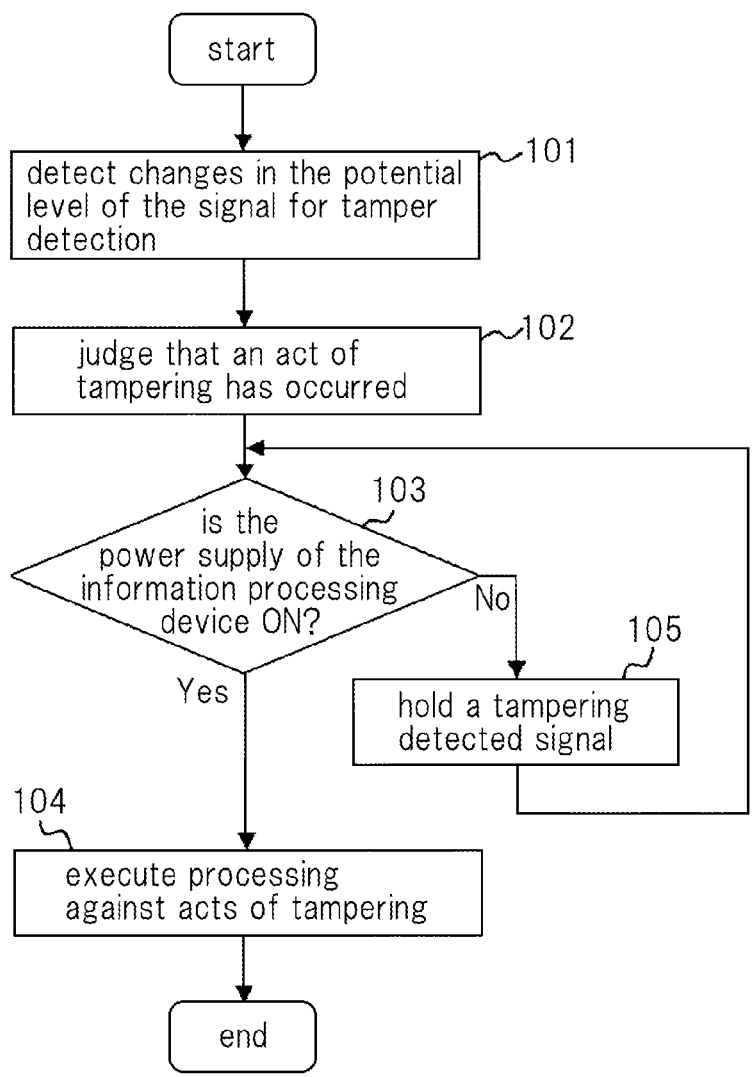
FIG. 6 is a flow chart showing the operating procedure at the time of detecting tampering in the module of the first exemplary embodiment.

The operation of module 10 of the present exemplary embodiment is next described. FIG. 5 is a schematic view showing an example when the sidewall shown in FIG. 1 is penetrated by a needle. FIG. 6 is a flow chart showing the operation procedure when tampering has been detected in the module of the present exemplary embodiment.

When someone attempts to tamper with memory unit 24 in module 10, a needle-shaped tool penetrates any one of boards 11 and 12 and sidewalls 13a-13d. FIG. 5 shows a case in which someone has penetrated sidewall 13a with needle 61. The following explanation regards a case in which needle 61 has penetrated sidewall 13a.

As shown in FIG. 5, when needle 61 pierces sidewall 13a and needle 61 comes into contact with both electrode 33 and electrode 34, the potential level of the signal for tamper detection of electrode 33 changes from a high level to a low level. In the present exemplary embodiment, the high level is a predetermined potential that differs from GND, and the low level is GND.

Upon detecting the change in the potential level of the signal for tamper detection (Step 101), holding circuit 21 of module 10 judges that tampering has occurred (Step 102). Holding circuit 21 next checks whether electric power is being supplied to module 10 from the outside. In the present exemplary embodiment, holding circuit 21 judges whether the power supply of the information processing device is in the ON state (Step 103).

If the power supply of the information processing device is in the ON state in Step 103, holding circuit 21 transmits a tampering detected signal to control unit 23. Control unit 23, upon receiving the tampering detected signal from holding circuit 21, executes a predetermined process for tampering (Step 104). In the present exemplary embodiment, control unit 23 erases the highly confidential information that has been stored in memory unit 24 from memory unit 24.

On the other hand, if the power supply of the information processing device is in the OFF state in Step 103, holding circuit 21 holds the tampering detected signal (Step 105). Later, when the power supply of the information processing device is turned ON, holding circuit 21 transmits the tampering detected signal to control unit 23 and then proceeds to Step 104.

Although the operation has here been described with reference to FIGS. 5 and 6 for a case in which a needle has pierced sidewall 13a, the operation when a needle penetrates any of sidewalls 13b-13d is the same as the case for sidewall 13a. Moreover, if the tamper detection patterns of boards 11 and 12 are constructed in the same way as the tamper detection pattern of sidewall 13a, the operation when a needle penetrates either of boards 11 and 12 will also be the same as for sidewall 13a.

Although the operation when a short-circuit occurs in a tamper detection pattern has been described, the operation is the same as described with reference to FIG. 6 when a tamper detection pattern is cut, and a detailed explanation of such an operation is therefore here omitted.

According to the configuration of the present exemplary embodiment, at least two electrode layers are provided with an insulating layer interposed in the sidewalls that are provided between the upper and lower boards of the casing that surrounds a circuit that needs to be tamper proof, and the electrodes of one of the two layers are arranged at positions corresponding to the spaces between the electrodes that are provided on the other of the two layers. As a result, a needle-like tool that pierces any part of the sidewalls will necessarily come into contact with the electrodes for tamper detection, thereby facilitating the change of the potential of the signal for tamper detection to GND and improving the tamper detection capability. As a result, the tamper proof can be improved.

In addition, the use of an anisotropic conductive rubber connector as the material on which the electrode layers are provided enables electrical connection between the tamper detection pattern that is provided on the upper board and the lower board by way of the sidewalls.

Second Exemplary Embodiment

This exemplary embodiment improves the tamper detection capability over that of the first exemplary embodiment in a module for protecting a circuit that needs to be tamper proof.

Figure 7:
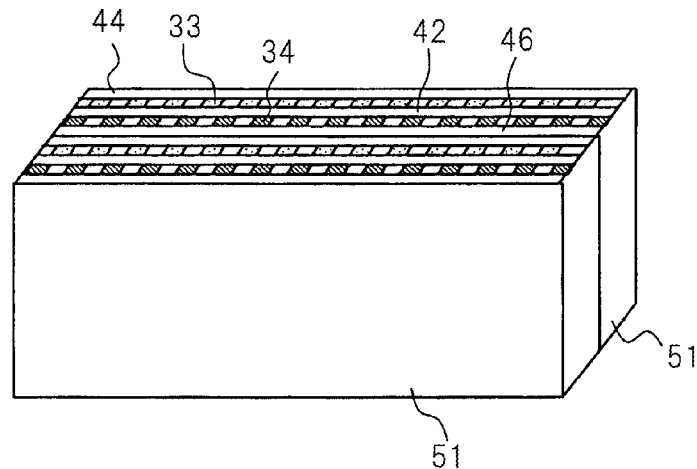
FIG. 7 is a perspective view showing an example of the configuration of a sidewall of the module in the second exemplary embodiment.

Explanation first regards the configuration of the module provided in the information processing device of the present exemplary embodiment. FIG. 7 is a perspective view showing an example of the configuration of the anisotropic conductive rubber connector that is provided in the sidewalls of the module in the present exemplary embodiment.

The module of the present exemplary embodiment is similar to that of the first exemplary embodiment with the exception that sidewalls 13a-13d shown in FIG. 1 have a configuration in which two layers of anisotropic conductive rubber connector 51 are laminated as shown in FIG. 7. As a result, detailed explanation of the configuration that is the same as that of the first exemplary embodiment has been omitted in the present exemplary embodiment.

Anisotropic conductive rubber connectors 51 are each of a construction that includes electrode layer 41 and electrode layer 43 shown in FIG. 3A. In the present exemplary embodiment as well, insulating layer 42 shown in FIG. 3A is arranged between electrode layer 41 and electrode layer 43, insulating layer 44 is arranged outside electrode layer 41, and insulating layer 46 is arrange outside electrode layer 43. In the present exemplary embodiment, each of sidewalls 13a-13d shown in FIG. 1 have a construction in which two anisotropic conductive rubber connectors 51 are laminated together.

According to the configuration shown in FIG. 7, anisotropic conductive rubber connectors 51 that include tamper detection patterns are of two laminated layers, whereby, when any person pierces any of sidewalls 13a-13d with a needle-like tool, the possibility that the tamper detection pattern will be short-circuited or disconnected is greater than in the first exemplary embodiment.

Another configuration of the anisotropic conductive rubber connector that is provided in the sidewalls of the module in the present exemplary embodiment is next described.

Figure 8A:
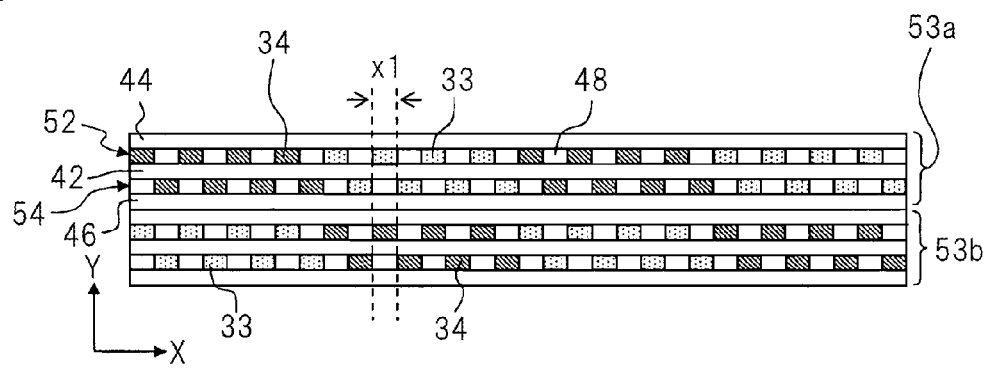
FIG. 8A shows another example of the configuration of a sidewall of the module in the second exemplary embodiment.
Figure 8B:
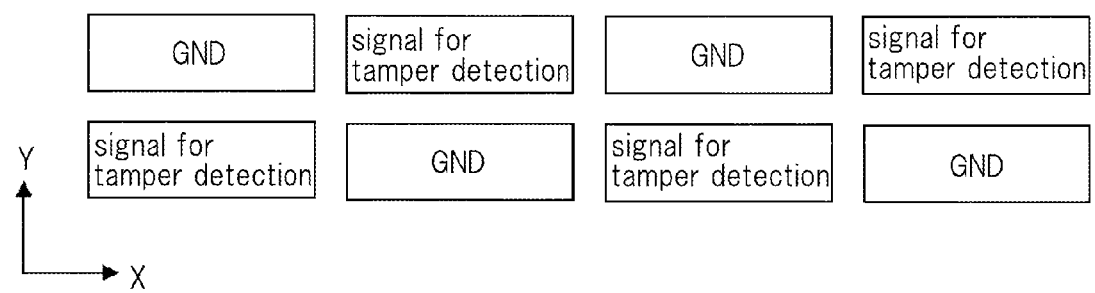
FIG. 8B shows another example of a sidewall of the module in the second exemplary embodiment.

FIGS. 8A and 8B show another example of the configuration of the anisotropic conductive rubber connector that is provided in the sidewalls of the module in the present exemplary embodiment. FIG. 8A shows the surface for connection with a board, and FIG. 8B shows the foot pattern in which the electrodes shown FIG. 8A are classified by type. In the interest of explanation, a case is here shown in which a construction is provided in sidewall 13a shown in FIG. 1 in which anisotropic conductive rubber connectors 53a and 53b shown in FIG. 8A are laminated together.

As shown in FIG. 8A, two anisotropic conductive rubber connectors are laminated in the order of anisotropic conductive rubber connectors 53b and 53a in the y-axis direction. Attention will first focus on anisotropic conductive rubber connector 53a.

Anisotropic conductive rubber connector 53a includes electrode layer 54 and electrode layer 52 that is laminated to electrode layer 54 in the y-axis direction with insulating layer 42 interposed there between. In the first exemplary embodiment, the type of electrodes provided on an electrode layer changed with each electrode layer. This point will be explained by referring to FIG. 3A. Electrodes 33 were provided on electrode layer 41 and electrodes 34 were provided on electrode layer 43. In contrast, in anisotropic conductive rubber connector 53a of the present exemplary embodiment, the type of electrodes differs at a predetermined pitch in the x-axis direction on both of the two electrode layers 52 and 54. This construction is described more specifically hereinbelow.

If the widths of electrodes 33 and 34 and insulation units 48 are all equal and this width is assumed to be x1, electrodes 34 are arranged in both electrode layers 52 and 54 over a range of "8×x1" from the left end of anisotropic conductive rubber connector 53a shown in FIG. 8A. On the other hand, electrodes 33 are also arranged in both electrode layers 52 and 54 over the next range of "8×x1" in the x-axis direction.

In the example of the configuration shown in FIG. 8A, if the plurality of electrodes that are provided in one "8×x1" range of the two electrode layers 52 and 54 is referred to as an "electrode group," the electrode groups of electrodes 33 and the electrode groups of electrodes 34 are arranged alternately at a pitch of "8×x1" in the x-axis direction in both electrode layers 52 and 54. However, the configuration in which the electrodes of one electrode layer of the two electrode layers 52 and 54 are located at positions that correspond to the spaces between the electrodes arranged in the other electrode layer is the same as the first exemplary embodiment.

Attention is next focused on anisotropic conductive rubber connector 53b.

Anisotropic conductive rubber connector 53b has electrode layers 52 and 54 similar to anisotropic conductive rubber connector 53a, but the types of electrodes of the electrode groups with respect to the x-axis direction differ from anisotropic conductive rubber connector 53a. To explain more specifically, the electrode groups of electrodes 34 of anisotropic conductive rubber connector 53b are arranged at positions that correspond to the electrode groups of electrodes 33 of anisotropic conductive rubber connector 53a, and the electrode groups of electrodes 33 of anisotropic conductive rubber connector 53b are arranged at positions that correspond to the electrode groups of electrodes 34 of anisotropic conductive rubber connector 53a.

In the example of the configuration shown in FIG. 8A, when sidewall 13a is cut away from the outer side of the casing as shown by the broken lines, electrode 34 and electrode 33 are at the same position with respect to x-axis direction, and coincide with respect to the y-axis direction with insulating layers 44 and 46, insulation units 48, and insulating layer 42 interposed. If these insulating layers and insulation units are referred to as insulators, then, regardless of which part of sidewall 13a is viewed from outside the casing, electrode 33, an insulator, and electrode 34 overlap in that order, or electrode 34, an insulator, and electrode 33 overlap in that order. This point is next described with reference to FIG. 8B.

The foot pattern shown in FIG. 8B classifies electrodes 33 shown in FIG. 8A as being in the pattern of the signal for tamper detection and classifies electrodes 34 shown in FIG. 8A as being in the pattern of GND. As shown in FIG. 8B, a pattern of the signal for tamper detection is always arranged outside a pattern of GND, and conversely, a GND pattern is always arranged outside a pattern of a signal for tamper detection.

As shown by the foot pattern shown in FIG. 8B, by adopting the configuration shown in FIG. 8A, even should sidewalls 13a-13d be pierced by a needle-shaped tool that is narrower than the width of electrodes 33 and 34, the pattern of the signal for tamper detection and the pattern of GND will be electrically connected by way of the needle-shaped tool, thereby causing the potential level of the signal for tamper detection to change and enabling reliable detection of tampering.

The length "8×x1" of one pitch with respect to the x-axis direction is only an example, and the pitch length is not limited to eight times the width of the electrodes.

Although a configuration has been described with reference to FIG. 7 and FIG. 8A in which two layers of anisotropic conductive rubber are laminated, a single layer of the anisotropic conductive rubber connector having four electrode layers, which is equivalent to the configuration in which two anisotropic conductive rubber connectors are laminated, may be provided in sidewalls 13a-13d.

Figure 9:
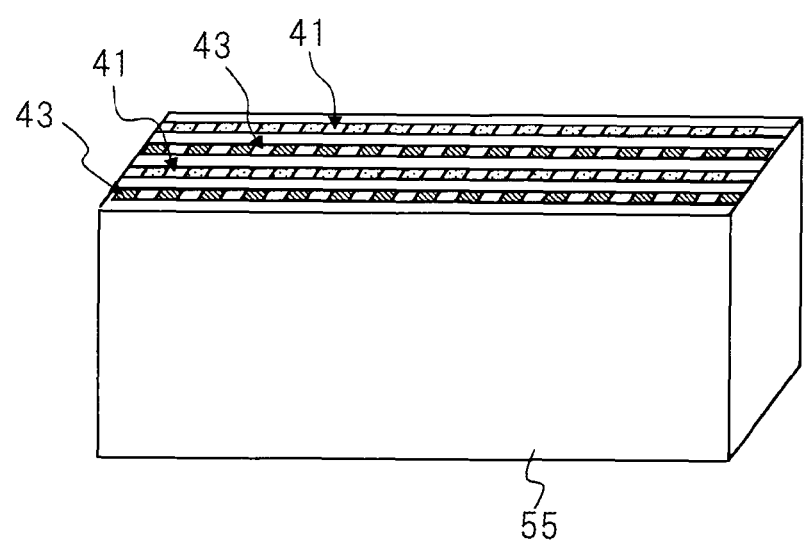
FIG. 9 is a perspective view showing a case in which the four electrode layers shown in FIG. 7 are provided in one layer of anisotropic conductive rubber connector.

FIG. 9 is a perspective view showing a case in which the four electrode layers shown in FIG. 7 are provided in one anisotropic conductive rubber connector 55. Alternatively, the four electrode layers shown in FIG. 8A may be provided as four layers in one anisotropic conductive rubber connector 55.

In the present exemplary embodiment, not only are the same effects obtained as in the first exemplary embodiment, but tamper proof is also improved due to improvement in tamper detection capabilities. The tamper detection pattern provided in the sidewalls of the module of the present exemplary embodiment may also be used in boards 11 and 12.

A case has been described hereinabove in the first and second exemplary embodiments in which the electrodes arranged in the electrode layers have the same width and the same pitch, but as long as the electrodes of one of two adjacent electrode layers that sandwich an interposed insulating layer are located at positions that correspond to the spaces between the electrodes arranged in the other electrode layer, the width and pitch may differ in the same electrode layer or may differ for each electrode layer.

The present invention can be applied to an information processing device that needs to be tamper proof such as an account settlement terminal that accepts contact-type IC (Integrated Circuit) cards.

As one example of the effects of the present invention, tamper proof can be improved for acts of tampering that are attempted from the side of a device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

EXPLANATION OF REFERENCE NUMBERS 10 module
11, 12 board
13a-13d sidewalls
21 holding circuit
22 battery
23 control unit
24 memory unit
33, 34 electrode
41, 43 electrode layer
51, 53a 53b, 55 anisotropic conductive rubber connector

The invention claimed is:

1. An information processing device comprising:
   a first board on which a tamper detection pattern is installed;
   a second board on which a tamper detection pattern is installed and that is arranged to face said first board; and
   sidewalls that are arranged between said first and second boards along outer peripheries of said first and second boards and that include a plurality of layers in which electrodes for tamper detection are provided;
   wherein:
   a circuit that needs to be tamper proof is provided in a space enclosed by said first and second boards and said sidewalls;
   said sidewalls, have a structure in which two anisotropic conductive rubbers, in which electrodes of one layer of two layers that are adjacent to each other, with an insulating layer interposed there between, are arranged at positions that correspond to spaces between electrodes of the other layer of said two layers, are stacked with an interposed insulating layer in a direction that said two layers are stacked with an interposed insulating layer; and
   said circuit that needs to be tamper proof is protected by said sidewalls and said tamper detection pattern, which is installed on said second board, is electrically connected to said first board via said anisotropic conductive rubbers of said sidewalls.

2. The information processing device according to claim 1, wherein:
   said sidewalls include an anisotropic conductive rubber that has four layers that include said two layers in which said electrodes for tamper detection are provided, and in two adjacent layers with an insulating layer interposed therebetween, within said four layers, electrodes in one layer are arranged at positions corresponding to spaces between electrodes of the other layer.

3. The information processing device according to claim 1, wherein:
   a first potential is applied to electrodes that are provided in one of said layers, and a second potential that is different from said first potential is applied to electrodes that are provided in the other layer.

4. The information processing device according to claim 2, wherein:
   in said two layers, first electrode groups that each include a plurality of electrodes to which a first potential is applied and second electrode groups that each include a plurality of electrodes to which a second potential that differs from said first potential is applied are alternately arranged in a predetermined direction;
   in the other two layers in which said two layers are laminated with an insulating layer interposed there between, said second electrode groups are arranged at positions that correspond to said first electrode groups of said two layers and said first electrode groups are arranged at positions that correspond to said second electrode groups of said two layers.

5. The information processing device according to claim 3, further comprising:

a holding circuit that monitors potential levels of electrodes to which said first potential is applied, and that, if said potential levels of electrodes to which said first potential is applied becomes the same as said second potential or electrodes to which said first potential is applied are disconnected, transmits a tampering detected signal which is a signal indicating that an act of tampering is detected;

a memory unit that stores highly confidential information and that corresponds to a circuit that needs to be said tamper proof; and a control unit that, upon receiving said tampering detected signal from said holding circuit, erases said highly confidential information from said memory unit.

6. The information processing device according to claim 1, wherein:

at least one board of said first and second boards includes a plurality of layers on which electrodes for tamper detection are provided, and has a construction in which said electrodes on one layer of two adjacent layers with an insulating layer interposed there between are arranged at positions corresponding to spaces between electrodes provided on the other layer.

\* \* \* \* \*